United States Patent
Wang

(10) Patent No.: US 12,533,642 B2
(45) Date of Patent: Jan. 27, 2026

(54) GAS-LIQUID MIXER

(71) Applicant: Hsiang-Shih Wang, Changhua (TW)

(72) Inventor: Hsiang-Shih Wang, Changhua (TW)

( * ) Notice: Subject to any disclaimer, the term of this patent is extended or adjusted under 35 U.S.C. 154(b) by 319 days.

(21) Appl. No.: 18/371,341

(22) Filed: Sep. 21, 2023

(65) Prior Publication Data

US 2025/0099924 A1    Mar. 27, 2025

(51) Int. Cl.
| | |
|---|---|
| *C02F 1/78* | (2023.01) |
| *B01F 23/23* | (2022.01) |
| *B01F 23/232* | (2022.01) |
| *B01F 23/237* | (2022.01) |
| *B01F 25/314* | (2022.01) |
| *B01F 101/00* | (2022.01) |

(52) U.S. Cl.
CPC .. *B01F 23/237613* (2022.01); *B01F 23/2323* (2022.01); *B01F 25/31422* (2022.01); *C02F 1/78* (2013.01); *B01F 2101/305* (2022.01)

(58) Field of Classification Search
CPC .............................. C02F 1/78; B01F 23/2323
See application file for complete search history.

(56) References Cited

FOREIGN PATENT DOCUMENTS

CN         204508907 U   *   7/2015

* cited by examiner

*Primary Examiner* — Robert A Hopkins
(74) *Attorney, Agent, or Firm* — Che-Yang Chen; Law Office of Michael Chen

(57) ABSTRACT

A gas-liquid mixer may include a connector, a main body, a mixing base, and a locating ring. The connector has a water inlet and a water outlet, and a first flow channel and a second flow channel are formed separately in the connector. The main body comprises a first tube body and a second tube body at one end, and a housing axially is formed at the other end thereof. At least a locating tube is formed inside the housing, and the inner tube portion of the locating tube penetrates through the bottom of the housing. The mixing base has an air duct formed at the center thereof, and a closed end is formed at one end of the air duct, and at least one horizontal through space formed corresponding to the locating tube in both quantity and position is positioned at the outer side of air duct.

7 Claims, 7 Drawing Sheets

GAS-LIQUID MIXER

FIELD OF THE INVENTION

The present invention relates to a gas-liquid mixer and more particularly to a mixer adequately mixing ozone with water and allowing high-flow discharge of the mixed gas-liquid.

BACKGROUND OF THE INVENTION

Water is the most essential substance in the human body, and even the rearing of poultry (chickens, ducks, geese) and livestock (cattle, sheep, pigs) is heavily reliant on water. Stable access to water is crucial for various types of poultry and livestock farming.

However, the use of conventional tap water can pose risks due to the accumulation of impurities (such as sediments or various deposits) in storage spaces like water towers and reservoirs. Water contaminated with potential pathogens poses a serious threat. If this contaminated water is used for poultry and livestock farming without proper treatment, it can lead to diseases or even death among the animals. Additionally, standard gas-liquid mixers are unable to produce a large flow of ozone-infused water, making them impractical for the extensive farming of poultry and livestock. Therefore, there remains a need for a new and improved design for a gas-liquid mixer to overcome the problems presented above.

SUMMARY OF THE INVENTION

The present invention provides a gas-liquid mixer comprising a connector, a main body, a mixing base, and a locating ring. The connector has a water inlet and a water outlet, and a first flow channel and a second flow channel are formed separately in the connector. The water inlet is connected to a water source, and the second flow channel positioned at the outer side of the first flow channel is communicated with the water inlet and the water outlet while the first flow channel is connected to an ozone generator so that an ozone generated by the ozone generator is adapted to be transported separately from the water source through the first flow channel. The main body comprises a first tube body and a second tube body at one end of the main body, and the second tube body is sleeved at the outer side of the first tube body, and a housing axially is formed at the other end of the main body. At least a locating tube is formed inside the housing, and the inner tube portion of the locating tube penetrates through the bottom of the housing. When the end of the main body having the first tube body and the second tube body is connected to the water outlet of the connector, the first tube body and the second tube body are respectively connected to the first flow channel and the second flow channel, and the locating tube is connected and communicated with the second flow channel so that the water source is adapted to flow through the second flow channel and the second tube body into the locating tube. The mixing base has an air duct formed at the center thereof, and a closed end is formed at one end of the air duct, and at least one horizontal through space formed corresponding to the locating tube in both quantity and position is positioned at the outer side of air duct. The through space is configured to receive a filter and to connect to the locating tube, and the mixing base is accommodated in the housing of the main body, and the locating ring is connected to the housing to prevent the mixing base from falling out of the housing. The air duct has a through hole laterally penetrating through the air duct at the position adjacent to the closed end. When the air duct is connected to the first tube body and the ozone passes through the through hole, the water source and the ozone are well-mixed in the through space and flow out of the mixing base together. The main body and the mixing base have at least one pair of the locating tube and the through space, so that the well-mixing of the water source and the ozone is provided at a high flow rate.

Comparing with conventional gas-liquid mixer, the present invention is advantageous because: (i) the water source and the ozone are adapted to flow from the connector through the main body into the mixing base, and the well-mixed of water source and the ozone in the mixing base which has been properly sterilized and disinfected is configured to flow out of the gas-liquid mixer to complete the raising of poultry and livestock; and (ii) the main body and the mixing base have at least a pair of the locating tube and the through space, so that it will allow the water source mixed with the ozone to flow out at a high flow rate, making it suitable for the breeding of poultry and livestock.

DETAILED DESCRIPTION OF THE INVENTION

Figure 1:
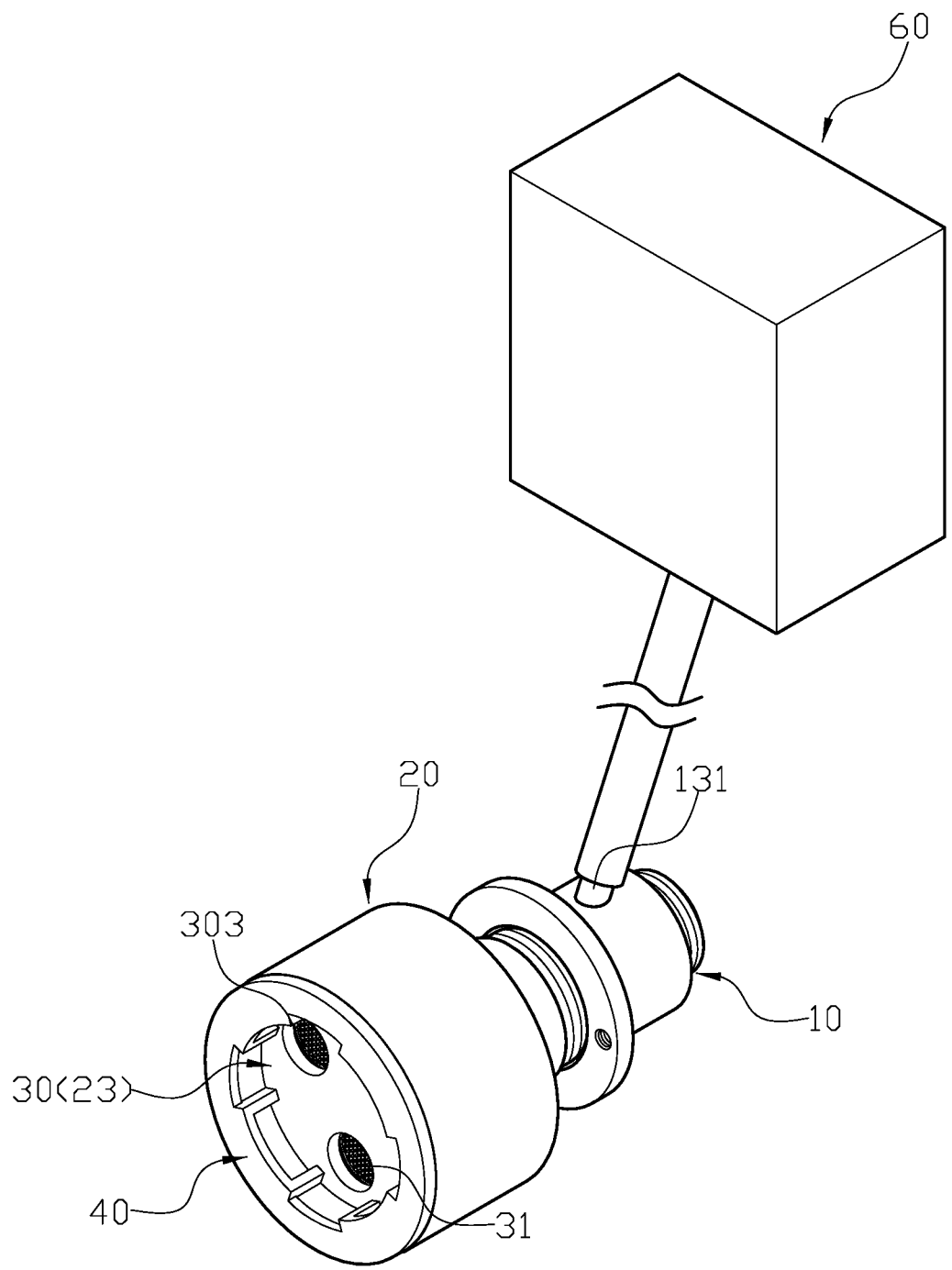
FIG. 1 is a three-dimensional assembly view of a gas-liquid mixer of the present invention.
Figure 2:
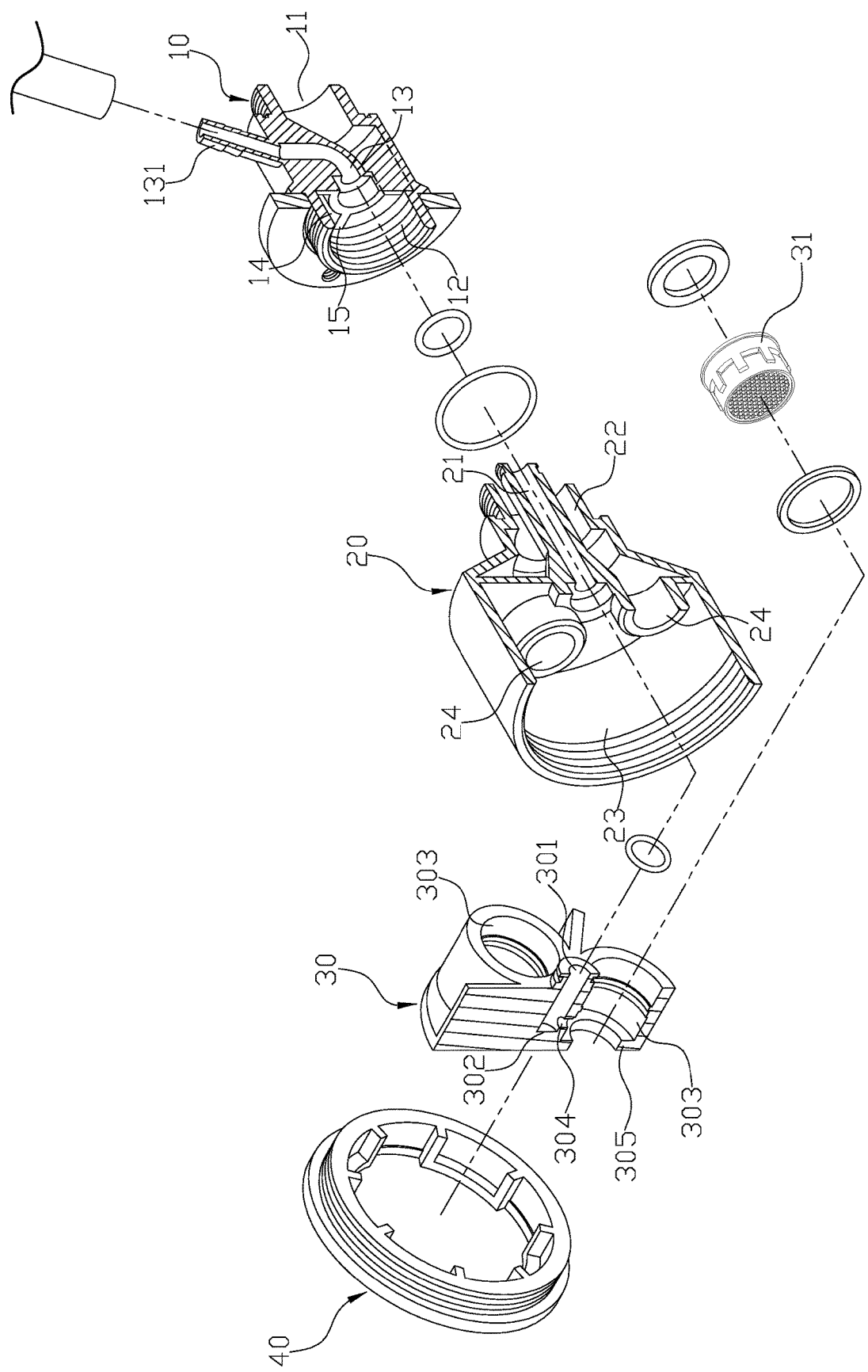
FIG. 2 is a three-dimensional exploded view of the gas-liquid mixer of the present invention.
Figure 3:
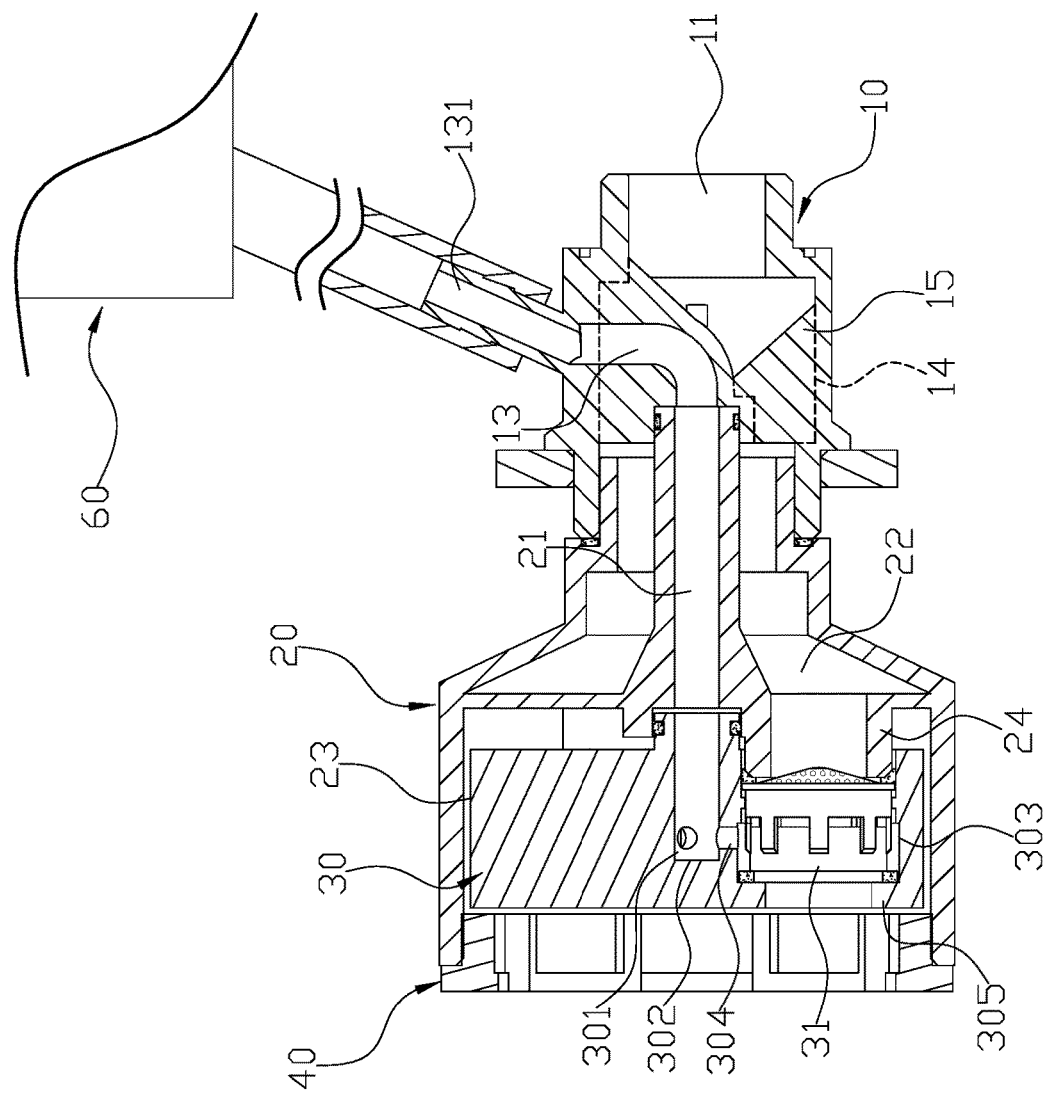
FIG. 3 is a sectional exploded view of the gas-liquid mixer of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, the present invention provides a gas-liquid mixer comprising a connector (10), a main body (20), a mixing base (30), and a locating ring (40). The connector (10) has a water inlet (11) and a water outlet (12), and a first flow channel (13) and a second flow channel (14) are formed separately in the connector (10). The water inlet (11) is connected to a water source (50), and the second flow channel (14) positioned at the outer side of the first flow channel (13) is communicated with the water inlet (11) and the water outlet (12) while the first flow channel (13) is connected to an ozone generator (60) so that an ozone (61) generated by the ozone generator (60) is adapted to be transported separately from the water source (50) through the first flow channel (13). The main body (20) comprises a first tube body (21) and a second tube body (22) at one end of the main body, and the second tube body (22) is sleeved at the outer side of the first tube body (21), and a housing (23) axially is formed at the other end of the main body (20). Moreover, at least a locating tube (24) is formed inside the housing (23), and the inner tube portion of the locating tube (24) penetrates through the bottom of the housing (23). When the end of the main body (20) having the first tube body (21) and the second tube body (22) is connected to the water outlet (12) of the connector (10), the first tube body (21) and the second tube body (22) are respectively connected to the first flow channel (13) and the second flow channel (14), and the locating tube (24) is connected and communicated with the second flow channel (14) so that the water source (50) is adapted to flow through the second flow channel (14) and the second tube body (22) into the locating tube (24). The mixing base (30) has an air duct (301) formed at the center thereof, and a closed end (302) is formed at one end of the air duct (301), and at least one horizontal through space (303) formed corresponding to the locating tube (24) in both quantity and position is positioned at the outer side of air duct (301). Furthermore, the through space (303) is configured to receive a filter (31) and to connect to the locating tube (24), and the mixing base (30) is accommodated in the housing (23) of the main body (20), and the locating ring (40) is connected to the housing (23) to prevent the mixing base (30) from falling out of the housing (23). The air duct (301) has a through hole (304) laterally penetrating through the air duct (301) at the position adjacent to the closed end (302). When the air duct (301) is connected to the first tube body (21) and the ozone (61) passes through the through hole (304), the water source (50) and the ozone (61) are well-mixed in the through space (303) and flow out of the mixing base (30) together. The main body (20) and the mixing base (30) have at least one pair of the locating tube (24) and the through space (303), so that the well-mixing of the water source (50) and the ozone (61) is provided at a high flow rate.

In one embodiment, the first flow channel (13) comprises a connecting tube (131) protruding out from the outer periphery of the connector (10), and the connecting tube (131) is connected to the ozone generator (60).

In another embodiment, a plurality of support plates (15) are formed between the second flow channel (14) and the first flow channel (13) so that the first flow channel (13) is connected and positioned inside the second flow channel (14) through the support plates (15).

In still another embodiment, the connector (10) and the main body (20) are connected through the screw-locking mechanism.

In a further embodiment, the main body (20) and the locating ring (40) are connected through the screw-locking mechanism.

In still a further embodiment, a blocking edge (305) is formed at the front end of the through space (303), and when the mixing base (30) is positioned in the housing (23), the locating tube (24) is coupled in the through space (303) having the filter therein, so that the filter (31) is positioned in the mixing base (30) through the locating tube (24) and the blocking edge (305).

In a preferred embodiment, the filter (31) is an aerator with filtering effect.

In another preferred embodiment, the connector (10), the main body (20), the mixing base (30), and the filter (31) are fitted with sealing rings at respective connection points.

In still another preferred embodiment, the main body (20) comprises two locating tubes (24) while the mixing base (30) has two horizontal through spaces (303), and each of the through spaces (303) comprises one filter (31) installed therein.

Figure 6:
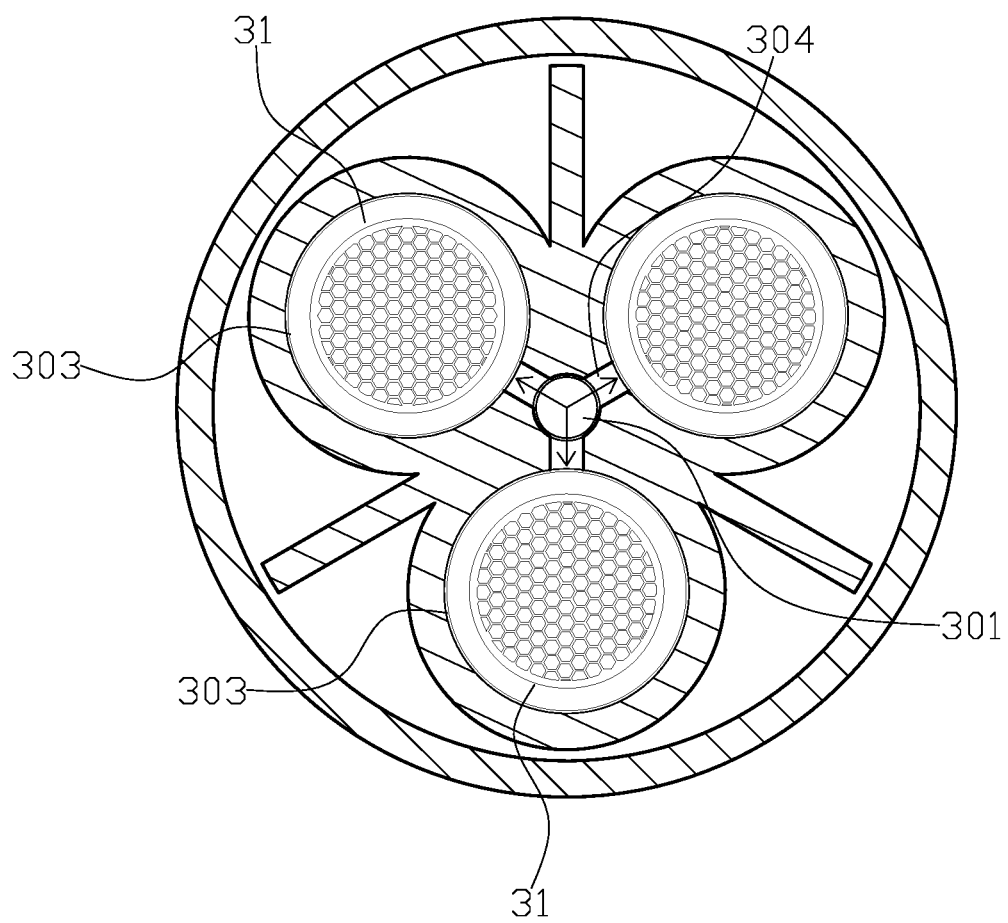
FIG. 6 is a schematic view illustrating the ozone is transported when the gas-liquid mixer of the present invention is in use.

In an advantageous embodiment, the main body (20) comprises three locating tubes (24) while the mixing base (30) has three horizontal through spaces (303), and each of the through spaces (303) comprises one filter (31) installed therein (as shown in FIG. 6).

Figure 7:
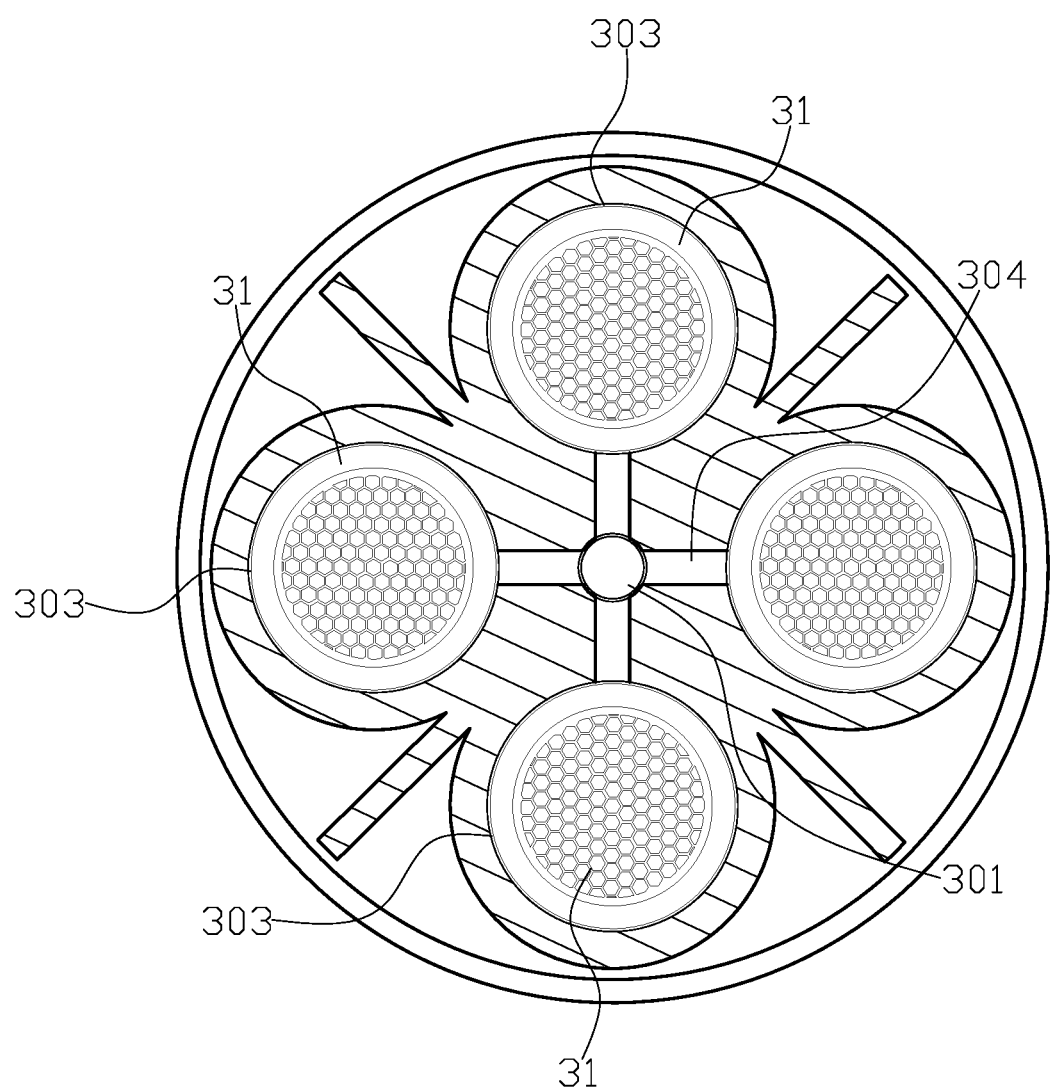
FIG. 7 is a schematic view of another embodiment illustrating the ozone is transported when the gas-liquid mixer of the present invention is in use.

In another advantageous embodiment, the main body (20) comprises four locating tubes (24) while the mixing base (30) has four horizontal through spaces (303), and each of the through spaces (303) comprises one filter (31) installed therein (as shown in FIG. 7).

Figure 4:
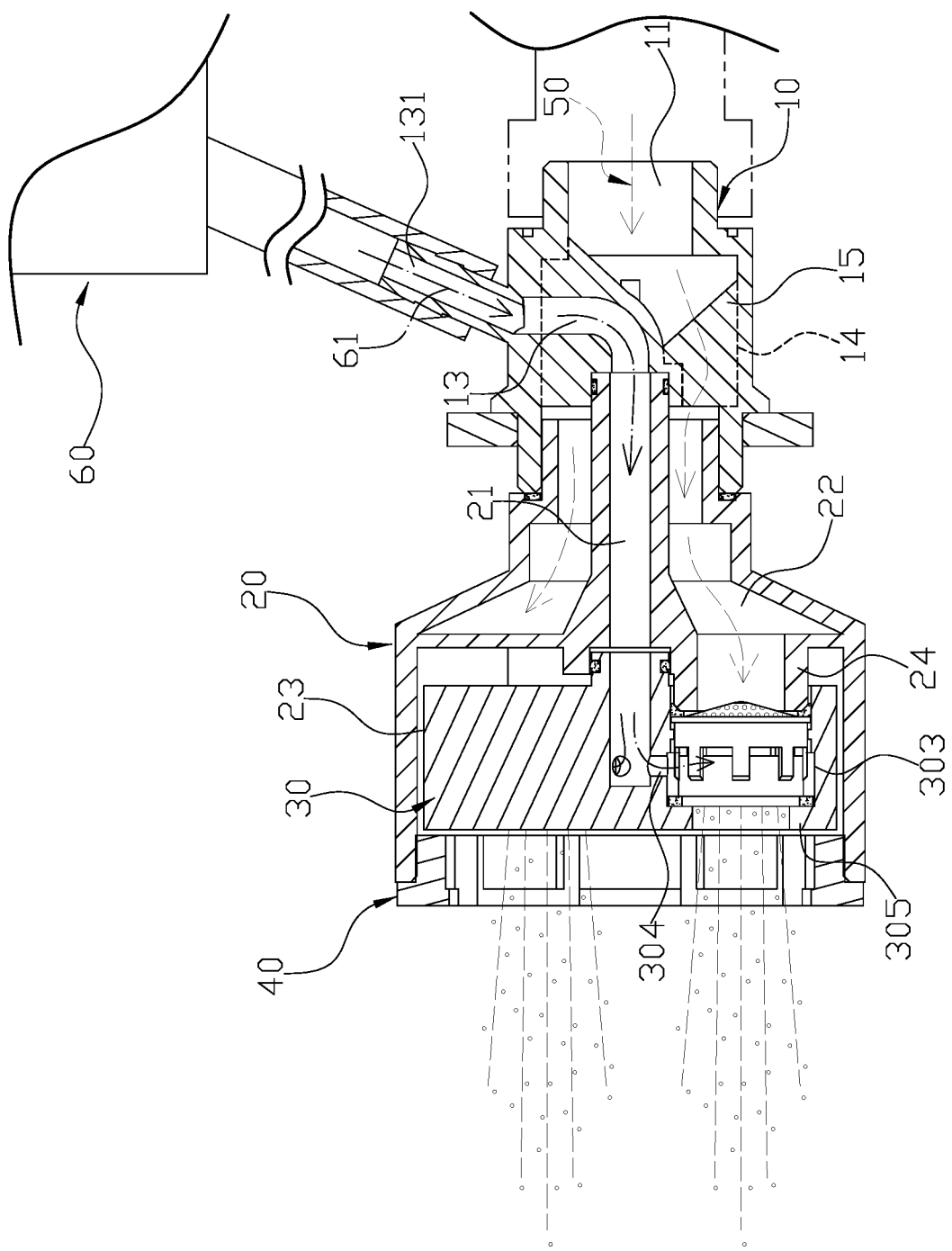
FIG. 4 is a schematic view illustrating a water source and an ozone are mixed when the gas-liquid mixer of the present invention is in use.
Figure 5:
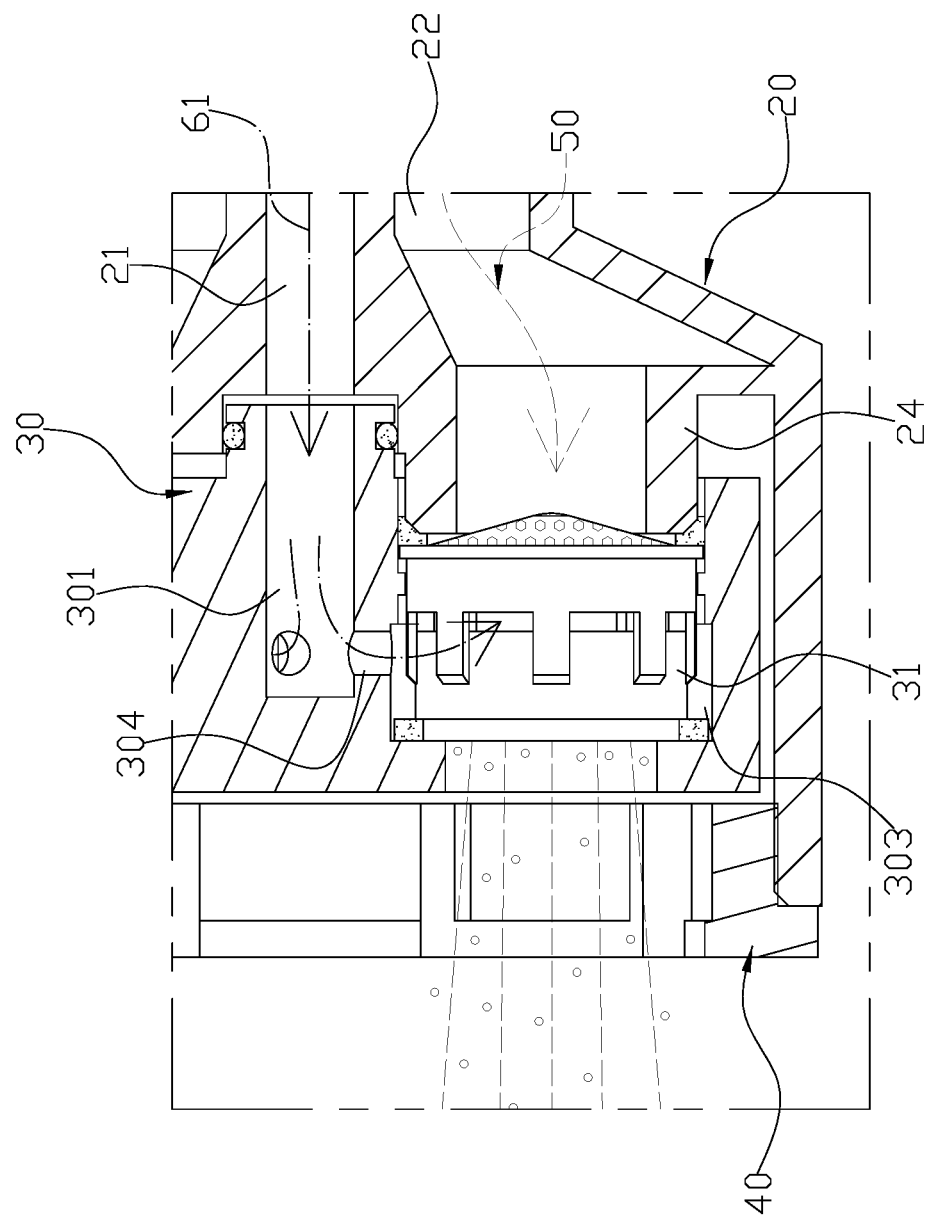
FIG. 5 is a partial enlarged view illustrating the water source and the ozone are mixed when the gas-liquid mixer of the present invention is in use.

Referring to FIGS. 4 to 6, in actual application, the water source (50) and the ozone (61) are adapted to flow from the connector (10) through the main body (20) into the mixing base (30). Then, the well-mixed of water source (50) and the ozone (61) in the mixing base (30) which has been properly sterilized and disinfected is configured to flow out of the gas-liquid mixer to complete the raising of poultry and livestock. The main body (20) and the mixing base (30) have at least a pair of the locating tube (24) and the through space (303), so that it will allow the water source (50) mixed with the ozone (61) to flow out at a high flow rate, making it suitable for the breeding of poultry and livestock.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A gas-liquid mixer comprising a connector, a main body, a mixing base, and a locating ring;
    wherein the connector has a water inlet and a water outlet, and a first flow channel and a second flow channel are formed separately in the connector; the water inlet is connected to a water source, and the second flow channel positioned at the outer side of the first flow channel is communicated with the water inlet and the water outlet while the first flow channel is connected to an ozone generator so that an ozone generated by the ozone generator is adapted to be transported separately from the water source through the first flow channel;

wherein the main body comprises a first tube body and a second tube body at one end of the main body, and the second tube body is sleeved at the outer side of the first tube body, and a housing axially is formed at the other end of the main body; at least a locating tube is formed inside the housing, and the inner tube portion of the locating tube penetrates through the bottom of the housing; when the end of the main body having the first tube body and the second tube body is connected to the water outlet of the connector, the first tube body and the second tube body are respectively connected to the first flow channel and the second flow channel, and the locating tube is connected and communicated with the second flow channel so that the water source is adapted to flow through the second flow channel and the second tube body into the locating tube; and wherein the mixing base has an air duct formed at the center thereof, and a closed end is formed at one end of the air duct, and at least one horizontal through space formed corresponding to the locating tube in both quantity and position is positioned at the outer side of air duct; the through space is configured to receive a filter and to connect to the locating tube, and the mixing base is accommodated in the housing of the main body, and the locating ring is connected to the housing to prevent the mixing base from falling out of the housing; the air duct has a through hole laterally penetrating through the air duct at the position adjacent to the closed end; when the air duct is connected to the first tube body and the ozone passes through the through hole, the water source and the ozone are well-mixed in the through space and flow out of the mixing base together; the main body and the mixing base have at least one pair of the locating tube and the through space, so that the well-mixing of the water source and the ozone is provided at a high flow rate.

2. The gas-liquid mixer of claim 1, wherein the first flow channel comprises a connecting tube protruding out from the outer periphery of the connector, and the connecting tube is connected to the ozone generator.

3. The gas-liquid mixer of claim 1, wherein a plurality of support plates are formed between the second flow channel and the first flow channel so that the first flow channel is connected and positioned inside the second flow channel through the support plates.

4. The gas-liquid mixer of claim 1, wherein the connector and the main body are connected through the screw-locking mechanism.

5. The gas-liquid mixer of claim 1, wherein the main body and the locating ring are connected through the screw-locking mechanism.

6. The gas-liquid mixer of claim 1, wherein a blocking edge is formed at the front end of the through space, and when the mixing base is positioned in the housing, the locating tube is coupled in the through space having the filter therein, so that the filter is positioned in the mixing base through the locating tube and the blocking edge.

7. The gas-liquid mixer of claim 1, wherein the filter is an aerator with filtering effect.

* * * * *